United States Patent
Jeong et al.

(10) Patent No.: US 9,752,674 B2
(45) Date of Patent: Sep. 5, 2017

(54) AUTOMOTIVE TRANSMISSION

(71) Applicants: Hyundai Motor Company, Seoul (KR); Kia Motors Corp., Seoul (KR); SL Corporation, Daegu (KR)

(72) Inventors: Won Jin Jeong, Hwaseong-si (KR); Deok Ki Kim, Hwaseong-si (KR); Yang Rae Cho, Suwon-si (KR); Ji Kwon Kim, Gyeongsan-si (KR); Ki Nyeong Ko, Seoul (KR); Sung Yong Kim, Seoul (KR); Man Young Cheon, Gyeongsan-si (KR)

(73) Assignees: Hyundai Motor Company, Seoul (KR); Kia Motors Corp., Seoul (KR); SL Corporation, Daegu (KR)

( * ) Notice: Subject to any disclaimer, the term of this patent is extended or adjusted under 35 U.S.C. 154(b) by 236 days.

(21) Appl. No.: 14/569,685

(22) Filed: Dec. 13, 2014

(65) Prior Publication Data
US 2016/0169373 A1  Jun. 16, 2016

(51) Int. Cl.
*F16H 59/02* (2006.01)
*F16H 59/04* (2006.01)
*F16H 59/10* (2006.01)

(52) U.S. Cl.
CPC ....... *F16H 59/0204* (2013.01); *F16H 59/105* (2013.01)

(58) Field of Classification Search
CPC ................ F16H 59/105; F16H 59/0204
See application file for complete search history.

(56) References Cited

U.S. PATENT DOCUMENTS

| | | | |
|---|---|---|---|
| 5,406,860 A * | 4/1995 | Easton | F16H 59/02 74/335 |
| 5,525,768 A * | 6/1996 | Cobb, III | F16H 59/105 200/11 G |
| 2013/0031999 A1 | 2/2013 | Farges | |

FOREIGN PATENT DOCUMENTS

| | | |
|---|---|---|
| KR | 10-0578631 B1 | 9/2001 |
| KR | 10-0783516 B1 | 12/2007 |
| KR | 10-2012-0060095 A | 6/2012 |

\* cited by examiner

*Primary Examiner* — Terence Boes
(74) *Attorney, Agent, or Firm* — Morgan, Lewis & Bockius LLP

(57) ABSTRACT

An automotive transmission includes a shift lever configured to move in one direction to select a shift stage, a housing formed to enclose one side of the shift lever; and a transmission sensing module positioned inside the housing to sense at least one of the transmission modes or the shift stages which are selected by the shift lever, wherein the transmission sensing module includes, a printed circuit board, at least one component configured to include a connection terminal electrically connected to the printed circuit board and to be operated depending on the selected transmission mode or shift stage, at least one component operated depending on at least one of the selected transmission modes or the shift stages and a cover part configured to be coupled with one surface of the printed circuit board and apply a pressure to the connection terminal to adhere to the printed circuit board.

12 Claims, 14 Drawing Sheets

AUTOMOTIVE TRANSMISSION

BACKGROUND OF THE INVENTION

Field of the Invention

The present invention relates to an automotive transmission, and more particularly, to an automotive transmission capable of selecting a desired transmission mode from a plurality of transmission modes and detecting a shift stage in the selected transmission mode.

Description of Related Art

An automotive transmission may have different gear ratios to constantly maintain a rotation of an engine depending on a speed of a vehicle and a driver may operate a shift lever mounted in the transmission to change the gear ratio of the transmission. As transmission mode of the automotive transmission, there are a manual transmission mode in which a driver may change a shift stage and an automatic transmission mode in which a shift stage is automatically changed depending on a speed when a driver selects a drive mode D.

In addition to this, a sport mode type transmission which may simultaneously perform the manual transmission mode and the automatic transmission mode using one transmission is used. The sport mode type transmission basically may perform the manual transmission for a driver to make a shift level of a gear up and down while performing an automatic transmission or perform a transmission by disposing a transmission performing the automatic transmission beside the transmission performing the manual transmission.

In this case, a method for detecting a switching of a transmission mode by a switch interlocking with a lower one side of the shift lever when the transmission mode is changed by making the driver operate the shift lever is implemented and components for selecting each transmission mode and detecting the shift stage in the selected transmission mode are separately provided.

In this case, there is a need to accommodate the components for selecting each transmission mode and detecting the shift stage in the selected transmission mode and include connectors and connection lines electrically connecting between each component, and therefore a configuration and an assembling process may be complicated and costs may be increased.

Further, the switch for selecting each transmission mode and detecting the shift stage in the selected transmission mode is implemented by a contact method using a protrusion shape contacting each other depending on a movement of the shift lever, a guide structure accommodating the protrusion shapes, and the like, and therefore noise and friction may occur.

Therefore, a scheme for simplifying the configuration by commonly using the components for selecting each transmission mode and detecting the shift stage in the selected transmission mode and reducing the noise and the friction by using a contactless detection method is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automotive transmission capable of selecting each transmission mode and detecting a shift stage in the selected transmission mode using a contactless method.

Various aspects of the present invention are directed to providing an automotive transmission capable of commonly using components for selecting each transmission mode and detecting a shift stage in the selected transmission mode and simplifying a structure and an assembling process by directly electrically connecting between the respective components without using a connector or a connection line.

In an aspect of the present invention, an automotive transmission may include a shift lever configured to move in a direction to select a shift stage, a housing enclosing one side of the shift lever, and a transmission sensing module positioned inside the housing to sense at least one of transmission modes and the shift stage which are selected by the shift lever, wherein the transmission sensing module may include a printed circuit board, at least one component configured to include a connection terminal electrically connected to the printed circuit board and to be operated depending on a selected transmission mode and/or the shift stage, and a cover part coupled with a surface of the printed circuit board and applying a pressure to the connection terminal to adhere to the printed circuit board.

The transmission sensing module may further include a sensing sensor mounted on the printed circuit board to sense at least one of the selected transmission mode and the shift stage, and a rotating member rotatably mounted on the cover part.

The sensing sensor may include a first hall sensor configured to sense a change in magnetic force due to a movement of a first magnet which is mounted in the shift lever, and a second hall sensor configured to sense a change in magnetic force due to a movement of a second magnet which is mounted by the rotating member.

The first hall sensor senses the selected transmission mode, and the second hall sensor senses a selected shift stage in the selected transmission mode.

The sensing sensor may include a first hall sensor configured to sense a change in magnetic force due to a movement of a first magnet which is mounted in the shift lever, and a photo sensor configured to be coupled with the rotating member to sense light which is blocked or transmitted by a light blocking part rotating in one direction depending on a rotation of the rotating member.

The first hall sensor senses the selected transmission mode, and wherein the photo sensor senses the selected shift stage in the selected transmission mode.

The rotating member is provided with an insertion groove into which an insertion protrusion formed at the shift lever is inserted and rotates by the insertion protrusion which rotates while having a predetermined radius at a time of a movement of the shift lever.

The component may include a restriction part configured to restrict a movement of the shift lever or release a restriction of the movement of the shift lever depending on the selected shift stage, and a signal generating part configured to generate a control signal to separate a starting key from a key box depending on the selected shift stage.

The housing may include a first housing and a second housing coupled with each other from both sides of the shift lever, and a third housing coupled from upper portions of the first and second housings.

The first housing is formed with a mounting space in which the transmission sensing module is mounted.

The third housing is provided with a passage through which one end of the shift lever penetratedly moves, and one surface of the third housing is provided with a groove corresponding to a transmission pattern.

The shift lever may include an elastic member, and a bullet supported by the elastic member and move while maintaining a contact state with an inner side of the groove depending on a movement of the shift lever.

However, technical problems of the present invention are not limited to the above-mentioned matters and other technical problems which are not mentioned can be clearly understood to those skilled in the art from the following descriptions.

According to an exemplary embodiment of the present invention, there is provided an automotive transmission, including: a shift lever configured to move in one direction to select a shift stage; a housing configured to be formed to enclose one side of the shift lever; and a transmission sensing module configured to be positioned inside the housing to sense at least one of the transmission mode and the shift stage which are selected by the shift lever, wherein the transmission sensing module includes: a printed circuit board, at least one component configured to include a connection terminal electrically connected to the printed circuit board and to be operated depending on the selected transmission mode and/or shift stage; and a cover part configured to be coupled with one surface of the printed circuit board and apply a pressure to the connection terminal to adhere to the printed circuit board.

Other detailed matters of the present invention are included in the detailed description and the accompanying drawings.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
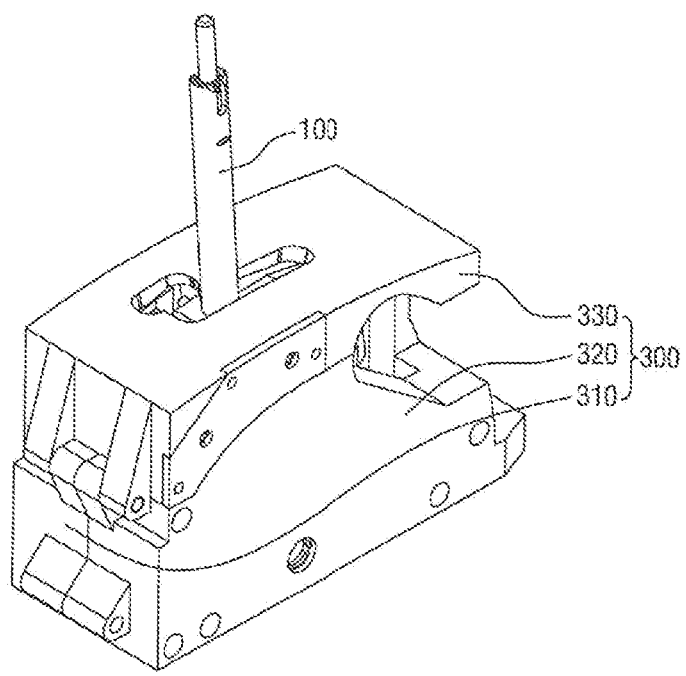
FIG. 1 is a perspective view of an automotive transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various advantages and features of the present invention and methods accomplishing thereof will become apparent from the following detailed description of embodiments with reference to the accompanying drawings. However, the present invention is not limited to exemplary embodiment disclosed herein but will be implemented in various forms. The exemplary embodiments make disclosure of the present invention thorough and are provided so that those skilled in the art can easily understand the scope of the present invention. Therefore, the present invention will be defined by the scope of the appended claims. Like reference numerals throughout the specification denote like components.

Therefore, in some exemplary embodiments, well-known process steps, well-known structures, well-known technologies are not described in detail to avoid that the present invention is ambiguously analyzed.

Terms used in the present specification are used only to describe specific exemplary embodiments rather than limiting the present invention. Unless explicitly described to the contrary, a singular form includes a plural form in the present specification. "Comprises" and "comprising" used herein does not exclude the existence or addition of at least one other components, steps, operations and/or elements other than stated components, steps, operations, and/or elements. Further, "and/or" includes each of the mentioned items and all combinations of the items.

Further, the exemplary embodiments described in the specification will be described with reference to cross-sectional views and/or schematic views that are ideal exemplified diagrams. Therefore, a form of exemplified diagrams may be changed by manufacturing technologies and/or tolerance. Therefore, the exemplary embodiments of the present invention are not limited to specific forms but may include the change in forms generated according to the manufacturing processes. Further, in each view illustrating the present invention, each component may be slightly expanded or reduced for convenience of explanation. Like reference numerals throughout the specification denote like components.

Hereinafter, the present invention will be described with reference to the accompanying drawings for describing an automotive transmission according to exemplary embodiments of the present invention.

Figure 2:
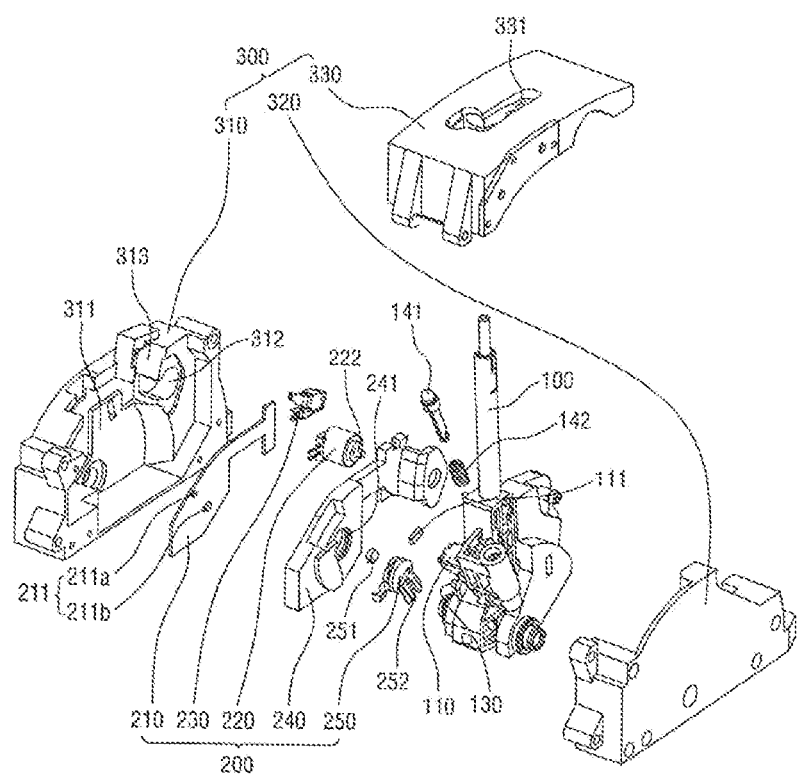
FIG. 2 is an exploded perspective view illustrating the automotive transmission according to the exemplary embodiment of the present invention.

FIG. 1 is a perspective view of an automotive transmission according to an exemplary embodiment of the present invention and FIG. 2 is an exploded perspective view illustrating the automotive transmission according to the exemplary embodiment of the present invention.

As illustrated, an automotive transmission 1 according to an exemplary embodiment of the present invention may include a shift lever 100, a transmission sensing module 200, and a housing 300.

The shift lever 100 moves in one direction to be configured to select a shift stage. Although not illustrated in FIGS. 1 and 2, an upper end of the shift lever 100 may be provided with a knob which serves as a handle and a driver holds the knob to move the shift lever 100 in one direction, thereby selecting the desired shift stage.

The shift stage which may be selected by the moving direction of the shift lever 100 or the movement of the shift lever 100 may vary depending on a transmission mode, a transmission pattern, or the like and in the exemplary embodiment of the present invention, as the transmission mode, there are an automatic transmission mode, a manual transmission mode, or the like and the transmission pattern includes "I", "H", and "I+" shapes as an example but is not limited thereto.

Figure 3:
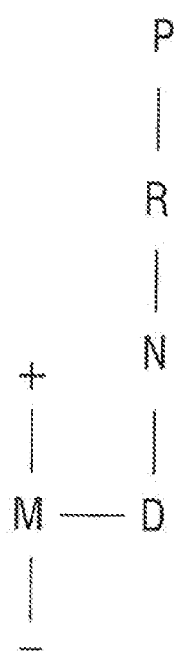
FIG. 3 is a diagram schematically illustrating a transmission pattern according to an exemplary embodiment of the present invention.

The automotive transmission 1 according to the exemplary embodiment of the present invention describes, for example, a case of a sport mode type transmission which may perform the automatic transmission and the manual transmission using one transmission. As illustrated in FIG. 3, in the automatic transmission mode, the case in which P, R, N, D stages may be selected will be described as an example and in the manual transmission mode, the case in which +, M, and − stages may be selected will be described as an example and the case in which the shift lever 100 moves to be switched to the manual transmission mode from the D stage of the automatic transmission mode to the M stage of the manual transmission mode will be described for example.

In this case, the transmission pattern of FIG. 3 is only an example to help understand the present invention and may include various transmission patterns which may perform the automatic transmission and the manual transmission.

The transmission sensing module 200 is disposed at one side of the shift lever 100 to be configured to sense the transmission mode or the shift stage which is selected by the movement of the shift lever 100.

The transmission sensing module 200 may include a printed circuit board 210 on which a sensing sensor 211 sensing at least one of the transmission mode and the shift stage is mounted, a restriction part 220 configured to be connected to the printed circuit board 210 to restrict the movement of the shift lever 100 or release a restriction of the movement of the shift lever 100, a signal generating part 230 configured to be connected to the printed circuit board 210 to generate a signal depending on the shift stage, a cover part configured to cover one surface of the printed circuit board 210, and a rotating member 250 configured to be rotatably mounted on the cover part 240 and rotate in one direction depending on the movement of the shift lever 100.

The sensing sensor 211 mounted on the printed circuit board 210 may include a first hall sensor 211a configured to sense the transmission mode and a second hall sensor 211b configured to sense the shift stage in the selected transmission mode, in which the first hall sensor 211a and the second hall sensor 211b sense a magnetic force generated by a magnet to be configured to sense the transmission mode and the shift stage.

The printed circuit board 210 may serve to supply power, input/output a signal, and the like to the sensing sensor 211 mounted on the printed circuit boar 210 and at least one component, that is, the above-mentioned restriction part 220 and signal generating part 230 which are electrically connected to the printed circuit board 210.

The first hall sensor 211a may sense a change in magnetic force generated by a first magnet 111 which is mounted on a magnet holder 110 formed at one side of the shift lever 100 and the second hall sensor 211b may sense a change in magnetic force generated by the second magnet 251 which is mounted on the rotating member 250, depending on the rotation of the rotating member 250.

That is, according to the exemplary embodiment of the present invention, the automotive transmission 1 is a sport mode type which may use both of the automatic transmission mode and the manual transmission mode and for the switching from the automatic transmission mode to the manual transmission mode, the shift lever 100 moves from the stage D to the stage M. In this case, a magnetic force is changed while a distance between the first hall sensor 211a and the first magnet 111 is changed and the first hall sensor 211a senses the change in magnetic force to be configured to sense the switching of the transmission mode.

Further, the stages F, R, N and D of the automatic transmission mode and the stages +, M and − of the manual transmission mode have only the difference in that the shift lever 100 moves between the stage D and the stage M but move in parallel with each other and therefore when the rotating member 250 rotates in response to the movement of the shift lever 100, the change in magnetic force due to the second magnet 251 which is mounted on the rotating member 250 is sensed.

The restriction part 220 may be a solenoid which restricts the movement of the shift lever 100 or release the restriction of the movement of the shift lever 100 depending on the shift stage and the signal generating part 230 may be a key interlock switch which generates a control signal to separate a starting key from a key box depending on the shift stage.

Figure 4:
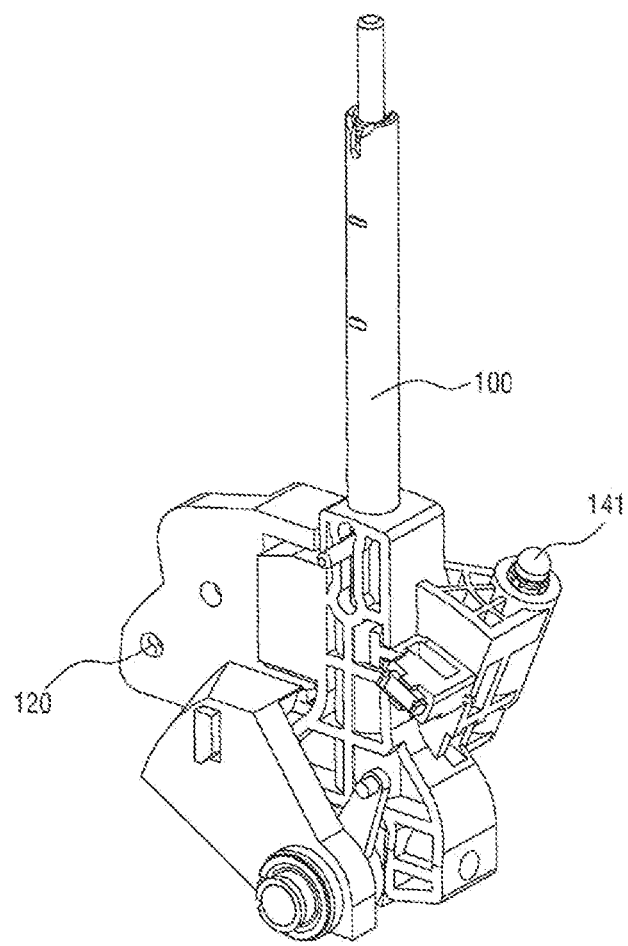
FIG. 4 is a perspective view of a shift lever according to an exemplary embodiment of the present invention.

When the restriction part 220 is configured of the solenoid, the restriction part 220 may include a rod 222 which may move in one direction in response to the control signal and as illustrated in FIG. 4, the rod 222 is inserted into or separated from the fixing groove 120 formed at the shift lever 100 to restrict the movement of the shift lever 100 or release the restriction of the movement of the shift lever 100. For example, when the stage P is selected, the rod 222 is inserted into the fixing groove 120 to restrict the movement of the shift lever 100 and when a brake pedal is pressed, the rod 222 is separated from the fixing groove 120 to release the restriction of the movement of the shift lever 100 to select another shift stages.

The exemplary embodiment of the present invention describes, for example, the case in which the restriction part 220 and the signal generating part 230 are electrically connected to the printed circuit board 210 but is only an example to help an understanding of the present invention and is not limited thereto. Therefore, various components to generate the control signal or control the movement of the shift lever 100 depending on the transmission mode or the shift stage may be electrically connected to the printed circuit board 210.

Figure 5:
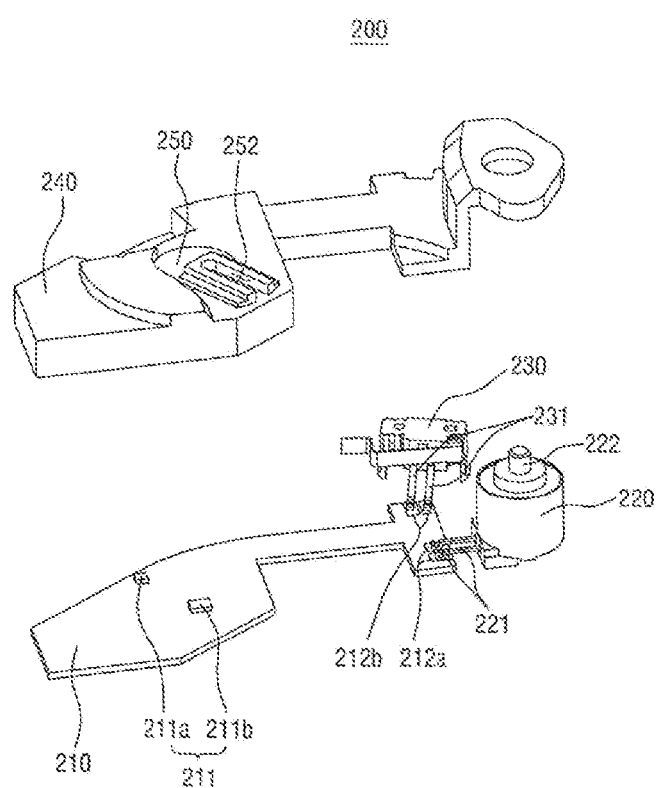
FIG. 5 is an exploded perspective view of a transmission sensing module according to an exemplary embodiment of the present invention.

In this case, as illustrated in FIG. 5, connection terminals 221 and 231 to electrically connect the restriction part 220 and the signal generating part 230 to the printed circuit board 210 may be each provided, each connection terminal 221 and 231 directly contacts contact terminals 212a and 212b of the printed circuit board 210 without using a separate connection line, and the cover part 240 is mounted on the printed circuit board 210 to apply a pressure to each connection terminal 221 and 231 to maintain a contact state with the contact terminals 212a and 212b formed on the printed circuit board 210.

Figure 6:
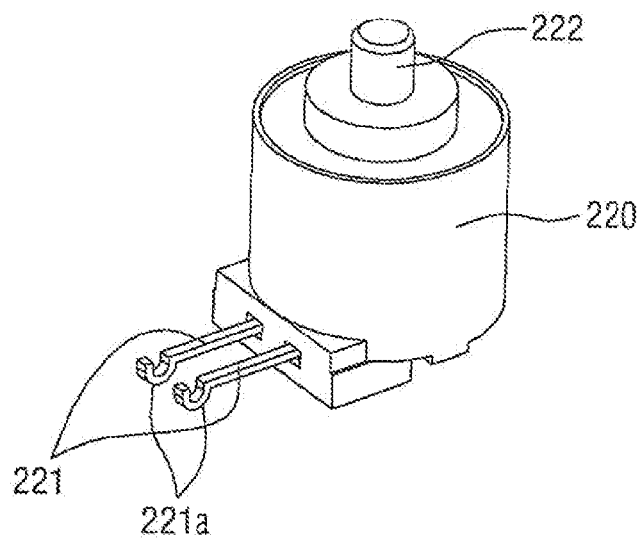
FIG. 6 is a perspective view of a restriction part according to an exemplary embodiment of the present invention.
Figure 7:
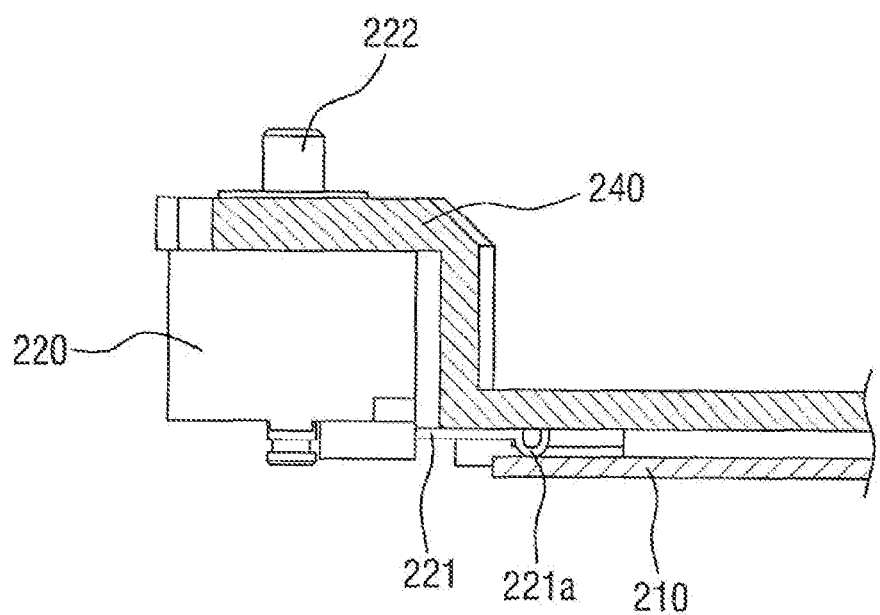
FIG. 7 is a cross-sectional view of the transmission sensing module according to the exemplary embodiment of the present invention.

For example, as illustrated in FIG. 6, the restriction part 220 may be provided with the connection terminal 221, the plurality of connection terminals 221 may be provided with a protruding part 221a having a tip which is drawn in one direction and then is formed to protrude to one side, and when the foregoing cover part 240 is mounted on the printed circuit board 210 in the state in which the protruding part 221a is disposed to be toward the printed circuit board 210, as illustrated in FIG. 7, one side of the cover part 240 applies a pressure to the connection terminal 221 so that the protruding part 221a of the connection terminal 221 and the printed circuit board 210 may be fixed to adhere to each other.

As such, the exemplary embodiment of the present invention has a structure in which when various kinds of components are electrically connected to the printed circuit board 210, the components directly contact the printed circuit board 210 without using the separate connection line, thereby previously preventing the problem of the complication of the structure and the difficulty of maintenance due to the connection lines and even when the printed circuit board 210 or various kinds of components are replaced, the separation may be simple by the separation of the cover part 240, thereby facilitating the replacement.

The exemplary embodiment of the present invention describes, for example, only the restriction part 220 but is only an example to help an understanding of the present invention and is not limited thereto. Therefore, the exemplary embodiment of the present invention may be similarly applied to the restriction part 220, the foregoing signal generating part 230, and various components and therefore a shape of the cover part 240 may be variously changed.

The cover part 240 is adjacently positioned on one surface of the printed circuit board 210 to protect various kinds of components mounted on the printed circuit board 210 and as described above, directly contact the restriction part 220 and the signal generating part 230 to the printed circuit board 210 without the connection line.

The rotating member 250 may be rotatably mounted in a mounting hole 241 which is formed on the cover part 240 and the rotating member 250 may include an insertion groove 252 into which an insertion protrusion 130 formed at one side of the shift lever 100 is inserted.

Therefore, when the shift lever 100 moves in one direction in the state in which the insertion protrusion 130 is inserted into the insertion groove 252, the insertion protrusion 130 rotates while having a predetermined radius, and therefore the rotating member 250 may rotate in one direction.

In this case, since a rotating central portion of the rotating member 250 is provided with a second magnet 251 as described above, as the shift lever 100 moves, the second magnet 251 also rotates to change the magnetic force, and therefore the second hall sensor 211b senses the change in magnetic force due to the second magnet 251 to sense the shift stage in the selected transmission mode.

A housing 300 is formed to surround one side of the shift lever 100 and the foregoing transmission sensing module 200 and may include a first housing 310 and a second housing 320 which are coupled with each other from both sides of the shift lever 100 and a third housing 330 which is coupled from upper portions of the first housing 310 and the second housing 320.

Figure 8:
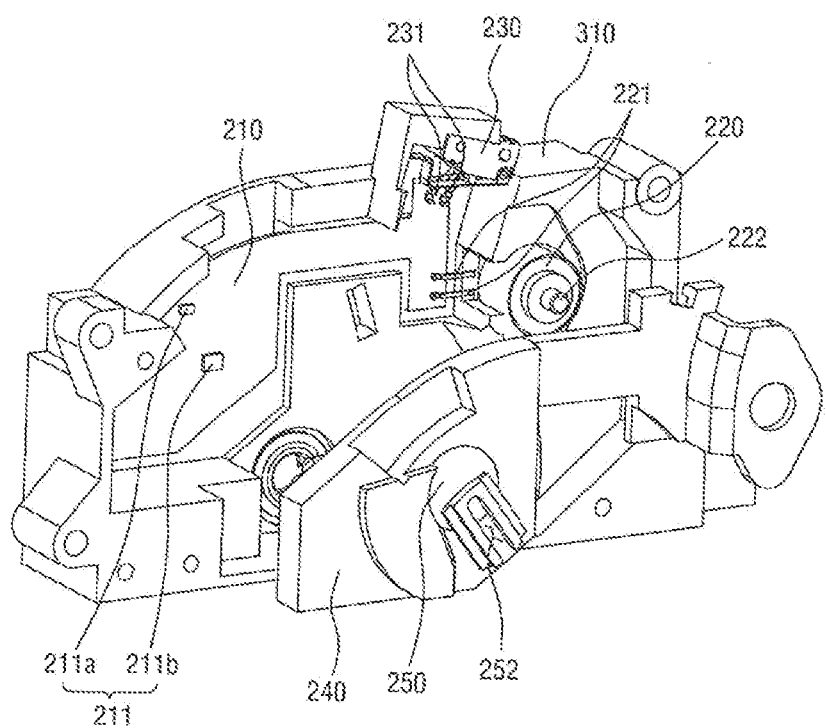
FIG. 8 is an exploded perspective view of the transmission sensing module mounted in a first housing according to an exemplary embodiment of the present invention.

An inner side of the first housing 310 may be provided with mounting spaces 311, 312, and 313 in which the foregoing transmission sensing module 200, that is, the printed circuit board 210, the restriction part 220 and the signal generating part 230 may be each mounted and as illustrated in FIG. 8, the first housing 310 is provided with the printed circuit board 210, the restriction part 220, and the signal generating part 230 and then the inner side of the first housing 310 may be provided with the foregoing cover part 240.

Figure 9:
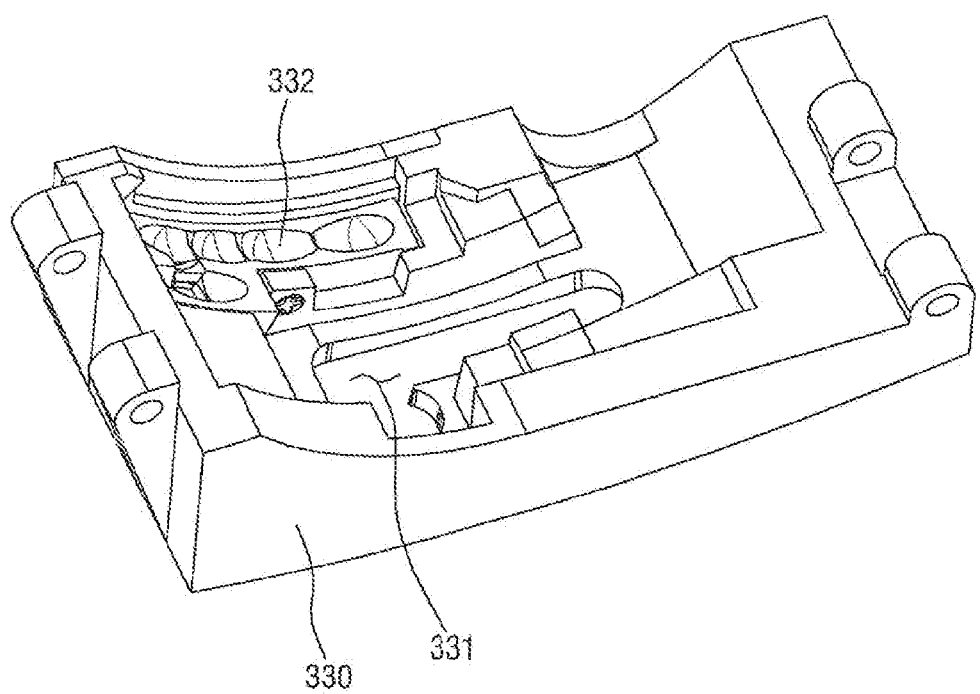
FIG. 9 is a perspective view of a third housing according to an exemplary embodiment of the present invention.
Figure 10:
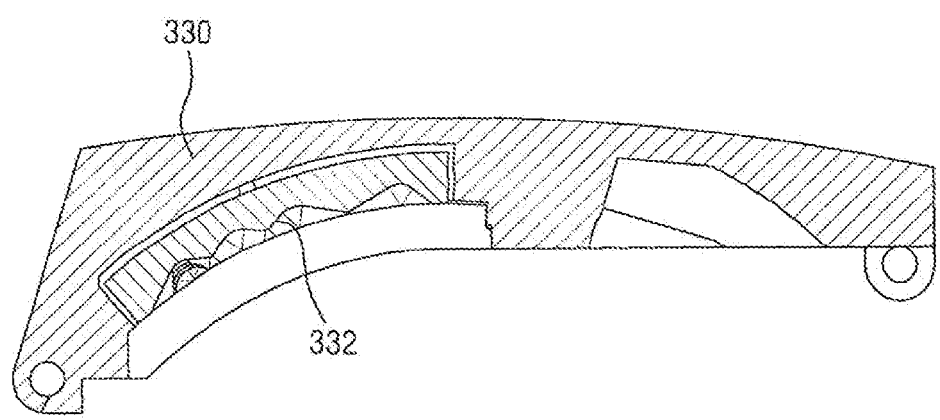
FIG. 10 is a cross-sectional view of the third housing according to the exemplary embodiment of the present invention.

The third housing 330 may be provided with a passage 331 through which one end of the shift lever 100 penetratedly moves and as illustrated in FIGS. 9 and 10, an inner side thereof may be provided with a groove 332 for generating operation feeling at a time of the movement of the shift lever 100.

A shape of the groove 332 may be variously changed depending on the foregoing transmission pattern and the shift lever 100 may be supported by an elastic member 142 and one side thereof may be provided with a bullet 141 which moves while maintaining the state in which one side of the bullet 141 contacts the groove 332.

Therefore, according to the exemplary embodiment of the present invention, since when the shift lever 100 moves, the bullet 141 moves in the state in which the bullet 141 contacts the groove 332, the operation feeling for each shift stage may be generated.

Meanwhile, the exemplary embodiment of the present invention described above describes, for example, the case in which all the shift stages for the automatic transmission mode and the manual transmission mode are sensed but is not limited thereto, and therefore the automotive transmission 1 may also sense only the shift stage included in any one of the automatic transmission mode and the manual transmission mode depending on the type.

Figure 11:
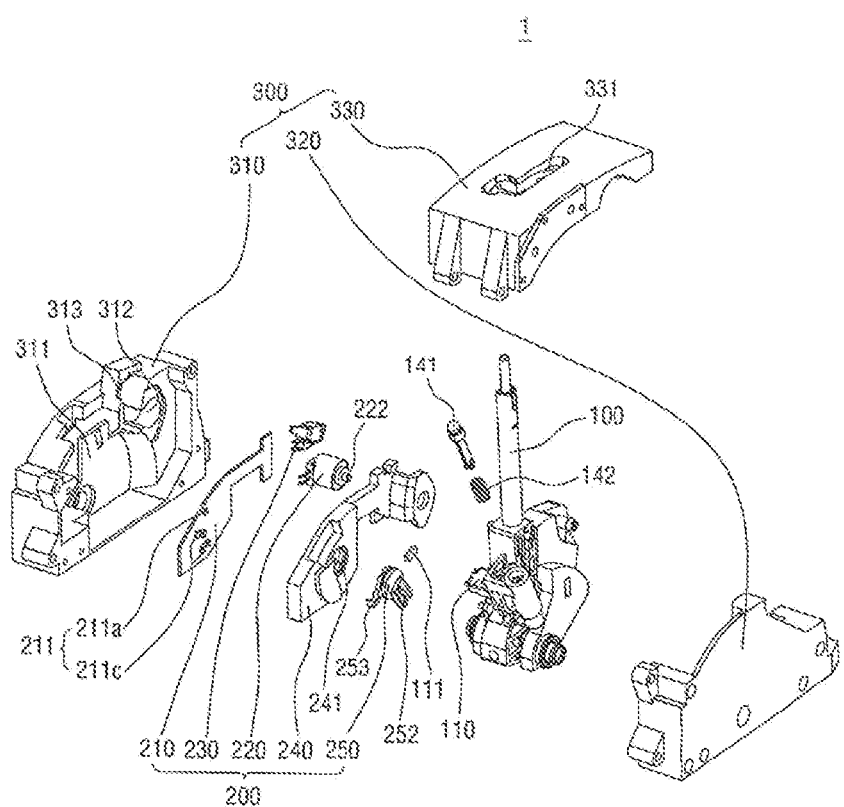
FIG. 11 is an exploded perspective view of an automotive transmission according to another exemplary embodiment of the present invention.

FIG. 11 is an exploded perspective view of an automotive transmission according to another exemplary embodiment of the present invention and FIG. 11 illustrates an example of the case in which only the shift stage for the manual transmission mode is sensed. That is, FIG. 11 illustrates an example of the case in which the movement from the stage D to the stage M and the selection of the stage + and the stage – are sensed. Further, in FIG. 11, the same components as FIG. 2 described above have the same function and the detailed description thereof will be omitted and the same components are denoted by the same reference numerals.

As illustrated, according to another exemplary embodiment of the present invention, to sense the switching from the automatic transmission mode to the manual transmission mode to sense the shift stage for the manual transmission mode, that is, in order for the shift lever 100 to sense the movement from the stage D to the stage M, similar to FIG. 2 described above, the first hall sensor 211a sensing the change in magnetic force due to the movement of the first magnet 111 mounted in the magnet holder 110 which is formed in the shift lever 110 may be mounted on the printed circuit board 210.

In this case, according to another exemplary embodiment of the present invention, as the shift lever 100 moves in the state in which the insertion protrusion 130 of the shift lever 100 is inserted into the insertion groove 251 of the rotating member 250, the rotating member 250 may rotate in one direction.

Figure 12:
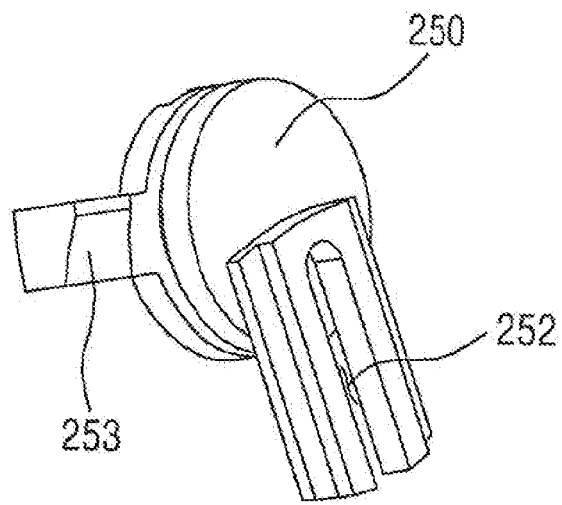
FIG. 12 and FIG. 13 are perspective views of a rotating member of FIG. 11.
Figure 13:
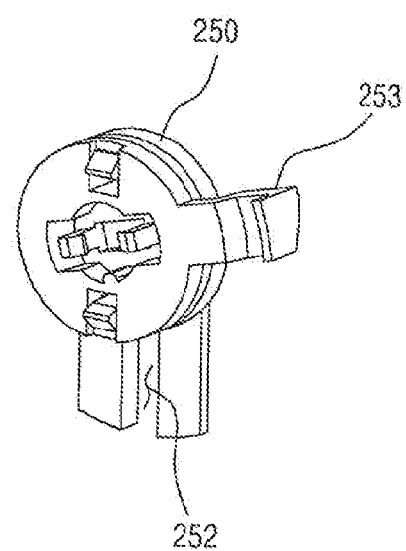

Further, according to another exemplary embodiment of the present invention, as illustrated in FIG. 12 and FIG. 13, the rotating member 250 may be coupled with a light blocking part 253 which rotates in one direction depending on the rotation of the rotating member 250 and one end of the light blocking part 253 blocks or transmits light while passing through a light emitting part 211d and a light receiving part 211e of a photo sensor 211c mounted on the printed circuit board 210 similar to the foregoing first hall sensor 211a to be configured to sense that the stage + or the stage − is selected in the manual transmission mode.

In this case, another exemplary embodiment of the present invention describes, for example, the case in which the rotating member 250 and the light blocking part 253 are hooked to each other but is only an example to help an understanding of the present invention and is not limited thereto and may also be coupled with each other by a fastener such as a screw, an adhesive, or the like.

According to another exemplary embodiment of the present invention, it may be appreciated that two photo sensors 211c are mounted on the printed circuit board 210 and the two photo sensors 211c are to sense the case in which the stage M is selected and then the selectable shift stage is the stage + and the stage − and but is not limited thereto and therefore the number of photo sensors 211c may be variously changed depending on the selectable shift stage in the selected transmission mode.

Figure 14:
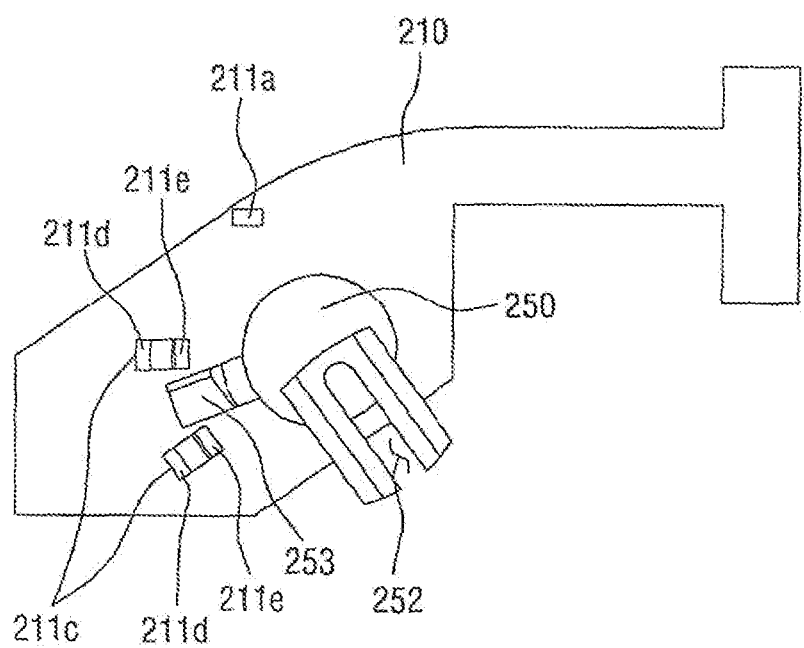
FIG. 14 and FIG. 15 are diagrams schematically illustrating an operation of a light blocking part of the automotive transmission according to another exemplary embodiment of the present invention.
Figure 15:
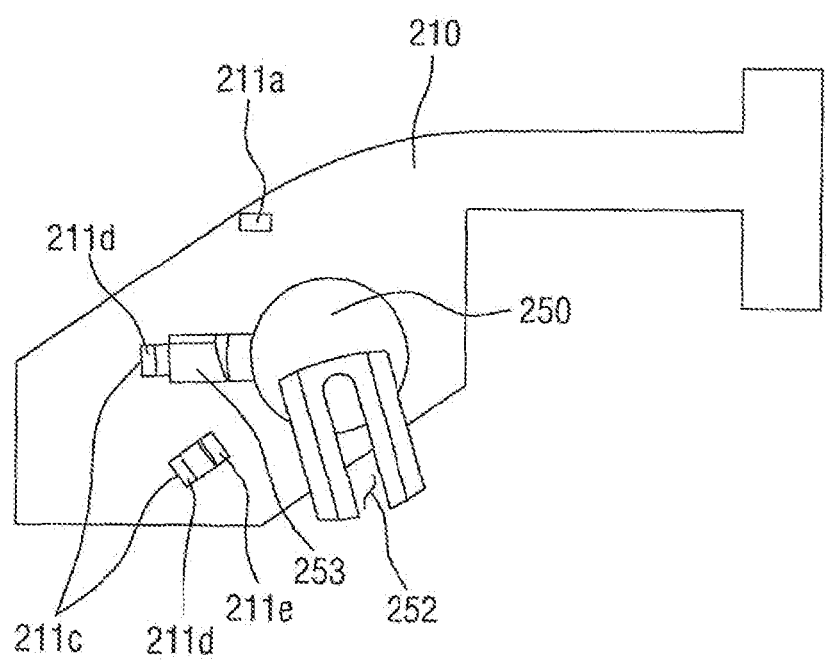

Describing the operation of sensing the shift stage by the foregoing light blocking part 253, when the stage M is selected from the stage D of the automatic transmission mode, the first hall sensor 211a senses the change in magnetic force due to the first magnet 111 and as illustrated in FIG. 14, the light blocking part 253 is disposed between the two photo sensors 211c and when the stage M is selected and then the stage + or the stage − is selected, as illustrated in FIG. 15, the light blocking part 253 is positioned between a light emitting part 211d and a light receiving part 211e of any one of the two photo sensors 211c by the rotation of the rotating member 250 to block light, thereby sensing the selected shift stage.

Meanwhile, similar to FIG. 11, it may be appreciated from FIG. 2 described above that the light blocking part 253 is formed at the rotating member 250 and when it is assumed that the rotating member 250 is commonly used depending on the type of the automotive transmission 1, when only the printed circuit board 210 and the second magnet 251 are changed, other components may be commonly used and when the light blocking part is not used in FIG. 2 described above, it may also be omitted.

Further, the exemplary embodiment of the present invention separately describes the cases of FIGS. 2 and 12 but is only an example to help an understanding of the present invention. Like the light blocking part 253 in FIG. 12 described above, commonly usable components may be designed to be commonly used to each other and when the components are designed to be commonly used, even though the type of the automotive transmission 1 is different, each component needs not be separately formed and when necessary, the first magnet 111, the second magnet 251, the first hall sensor 211a, the second hall sensor 211b, the photo sensor 211c, and the like which are described above may be designed to be used together to sense all the shift stages for each case.

The automotive transmission according to the exemplary embodiments of the present invention having the above configuration may obtain at least one of the following effects.

The components for selecting each transmission mode and detecting the shift stage in the selected transmission mode may be commonly used and the detection may be performed by the contactless method, thereby simplifying the structure and the assembling process.

Further, when the respective components are electrically connected to each other, the connection terminals of each component directly contact each other without using the connectors or the connection lines, thereby simplifying the structure and facilitating the maintenance.

However, the effects of the present invention are not limited to the above-mentioned effects and other effects which are not mentioned can be clearly understood to those skilled in the art from claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive transmission, comprising:
   a shift lever configured to move in a direction to select a shift stage;
   a housing enclosing one side of the shift lever; and
   a transmission sensing module positioned inside the housing to sense at least one of transmission modes and the shift stage which are selected by the shift lever,
   wherein the transmission sensing module includes:
      a printed circuit board;
      at least one component configured to include a connection terminal electrically connected to the printed circuit board and to be operated depending on a selected transmission mode and/or the shift stage; and
      a cover part coupled with a surface of the printed circuit board and applying a pressure to the connection terminal to adhere to the printed circuit board, and
   wherein the transmission sensing module further includes:
      a sensing sensor mounted on the printed circuit board to sense at least one of the selected transmission mode and the shift stage; and
      a rotating member rotatably mounted on the cover part.

2. The automotive transmission of claim 1, wherein the sensing sensor includes:
   a first hall sensor configured to sense a change in magnetic force due to a movement of a first magnet which is mounted in the shift lever; and
   a second hall sensor configured to sense a change in magnetic force due to a movement of a second magnet which is mounted by the rotating member.

3. The automotive transmission of claim 2,
   wherein the first hall sensor senses the selected transmission mode, and
   wherein the second hall sensor senses a selected shift stage in the selected transmission mode.

4. The automotive transmission of claim 2, wherein the sensing sensor includes:
   a first hall sensor configured to sense a change in magnetic force due to a movement of a first magnet which is mounted in the shift lever; and
   a photo sensor configured to be coupled with the rotating member to sense light which is blocked or transmitted by a light blocking part rotating in one direction depending on a rotation of the rotating member.

5. The automotive transmission of claim 4,
   wherein the first hall sensor senses the selected transmission mode, and
   wherein the photo sensor senses the selected shift stage in the selected transmission mode.

6. The automotive transmission of claim 2, wherein the rotating member is provided with an insertion groove into which an insertion protrusion formed at the shift lever is inserted and rotates by the insertion protrusion which rotates while having a predetermined radius at a time of a movement of the shift lever.

7. The automotive transmission of claim 1, wherein the component includes:
   a restriction part configured to restrict a movement of the shift lever or release a restriction of the movement of the shift lever depending on the selected shift stage; and
   a signal generating part configured to generate a control signal to separate a starting key from a key box depending on the selected shift stage.

8. The automotive transmission of claim 1, wherein the housing includes:
   a first housing and a second housing coupled with each other from both sides of the shift lever; and
   a third housing coupled from upper portions of the first and second housings.

9. The automotive transmission of claim 8, wherein the first housing is formed with a mounting space in which the transmission sensing module is mounted.

10. The automotive transmission of claim 8,
    wherein the third housing is provided with a passage through which one end of the shift lever penetratedly moves, and
    wherein one surface of the third housing is provided with a groove corresponding to a transmission pattern.

11. The automotive transmission of claim 10, wherein the shift lever includes:
    an elastic member; and
    a rod member supported by the elastic member engaged on a part of the rod member, wherein the rod member is movable while maintaining a contact state with an inner side of the groove depending on a movement of the shift lever.

12. An automotive transmission, comprising:
    a shift lever configured to move in a direction to select a shift stage;
    a housing enclosing one side of the shift lever; and
    a transmission sensing module positioned inside the housing to sense at least one of transmission modes and the shift stage which are selected by the shift lever,
    wherein the transmission sensing module includes:
      a printed circuit board;
        at least one component configured to include a connection terminal electrically connected to the printed circuit board and to be operated depending on a selected transmission mode and/or the shift stage; and
        a cover part coupled with a surface of the printed circuit board and applying a pressure to the connection terminal to adhere to the printed circuit board, and
    wherein the component includes:
      a restriction part configured to restrict a movement of the shift lever or release a restriction of the movement of the shift lever depending on the selected shift stage; and
      a signal generating part configured to generate a control signal to separate a starting key from a key box depending on the selected shift stage.

* * * * *